Sept. 26, 1933.    W. A. BARR    1,928,086
FLOW CONTROL APPARATUS
Original Filed July 9, 1928    6 Sheets-Sheet 1

INVENTOR.
Walter A. Barr.
BY Jesse R. Langley
ATTORNEY.

Sept. 26, 1933.    W. A. BARR    1,928,086

FLOW CONTROL APPARATUS

Original Filed July 9, 1928    6 Sheets-Sheet 3

INVENTOR.
Walter A. Barr.
BY Jesse R. Langley
ATTORNEY.

Sept. 26, 1933.       W. A. BARR       1,928,086
FLOW CONTROL APPARATUS
Original Filed July 9, 1928    6 Sheets-Sheet 5

INVENTOR.
Walter A. Barr.
BY Jesse R. Langley
ATTORNEY.

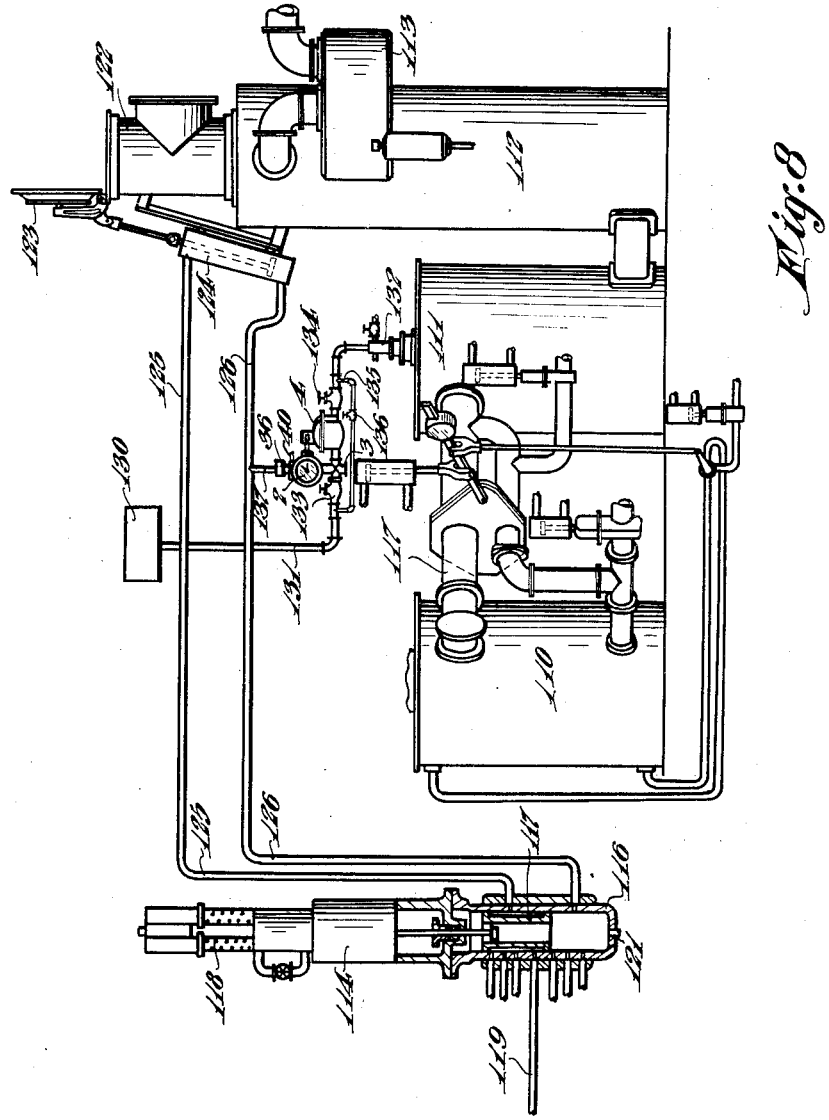

Patented Sept. 26, 1933

1,928,086

UNITED STATES PATENT OFFICE 1,928,086

FLOW CONTROL APPARATUS

Walter A. Barr, Fort Wayne, Ind., assignor to The Western Gas Construction Company, a corporation of Indiana Original application July 9, 1928, Serial No. 291,309. Divided and this application August 15, 1929. Serial No. 386,067. Renewed February 2, 1933

15 Claims. (Cl. 221—101)

This invention relates to apparatus for regulating the flow of fluids through conduits, and more particularly to an apparatus for operating a valve in a fluid conduit at predetermined intervals and for closing the valve automatically when a predetermined amount of fluid has passed through the conduit.

My invention further relates to apparatus that is particularly useful in the manufacture of gas such as fuel gas and the like, as the apparatus of my invention is particularly adapted for use in connection with such apparatus as a carburetted water-gas set and other installations wherein it is desired to supply a fluid intermittently to gas-manufacturing or other apparatus.

This application is a division of my application Serial No. 291,309, filed July 9, 1928.

An object of my invention is to provide apparatus for so governing the flow of a fluid through a conduit that only a predetermined amount of fluid may be allowed to flow through said conduit in one operation.

A second object of my invention is to provide apparatus for so controlling a valve in a fluid conduit as to cause the valve to be opened at predetermined intervals and to close either when a predetermined amount of fluid has passed through said conduit or when a predetermined time interval or operating period has elapsed.

A further object of the present invention is to provide apparatus of the class described that shall be subject to regulation both as to the amount of fluid allowed to pass in one operation, and as to the period of time that elapses between successive operations.

A further object of my invention is to provide apparatus for intermittently supplying measured amounts of fluid to gas-manufacturing apparatus that shall be adapted to the requirements of such apparatus and the process or processes carried out therein.

A further object of my invention is to provide apparatus for automatically supplying predetermined amounts of oil or other fluid to a carburetted water-gas set, that is effective to render the operation of such set more nearly automatic than has been possible heretofore.

In addition to the general objects recited hereinabove, my invention has for its object such other operative advantages or results as may hereinafter be found to obtain.

My apparatus is preferably applied to a fluid conduit connected to a source of fluid supply and to a point or points to which the fluid is to be supplied, and consists briefly of a valve in the conduit for controlling the flow of fluid, a meter in the conduit, means for opening the valve that is responsive to an impulse preferably given at a predetermined interval or at a definite stage in a process or cycle of operation, means for releasing and closing the valve when a predetermined amount of fluid has been supplied, and means for inaugurating the operation of the device at predetermined or definite intervals.

Various other parts and details are provided, the natures and functions of which will be described hereinbelow.

A novel feature of my apparatus resides in the fact that the meter which serves to measure the flow of fluid is an integral part of the device and actually drives that part of the mechanism that under normal circumstances serves to close the valve and to shut off the supply of fluid after a predetermined amount is allowed to pass through the device to the point to be supplied. An advantage of this arrangement is the precision and accuracy of volume control which is thereby effected.

In order that my invention may be clearly and fully set forth and understood, I now describe with reference to the accompanying drawings, the preferred manner and form in which it is embodied.

In the drawings, which illustrate the apparatus in a particular form and embodiment, as well as certain applications thereof, Figure 1 is a front elevational view of the control apparatus;

Fig. 8 is a more or less diagrammatic elevational view of a carburetted water-gas set, including a device for automatically operating the same, and showing a particular application of the device of the present invention to the set.

In the drawings, similar reference numerals designate similar parts.

Figure 1:
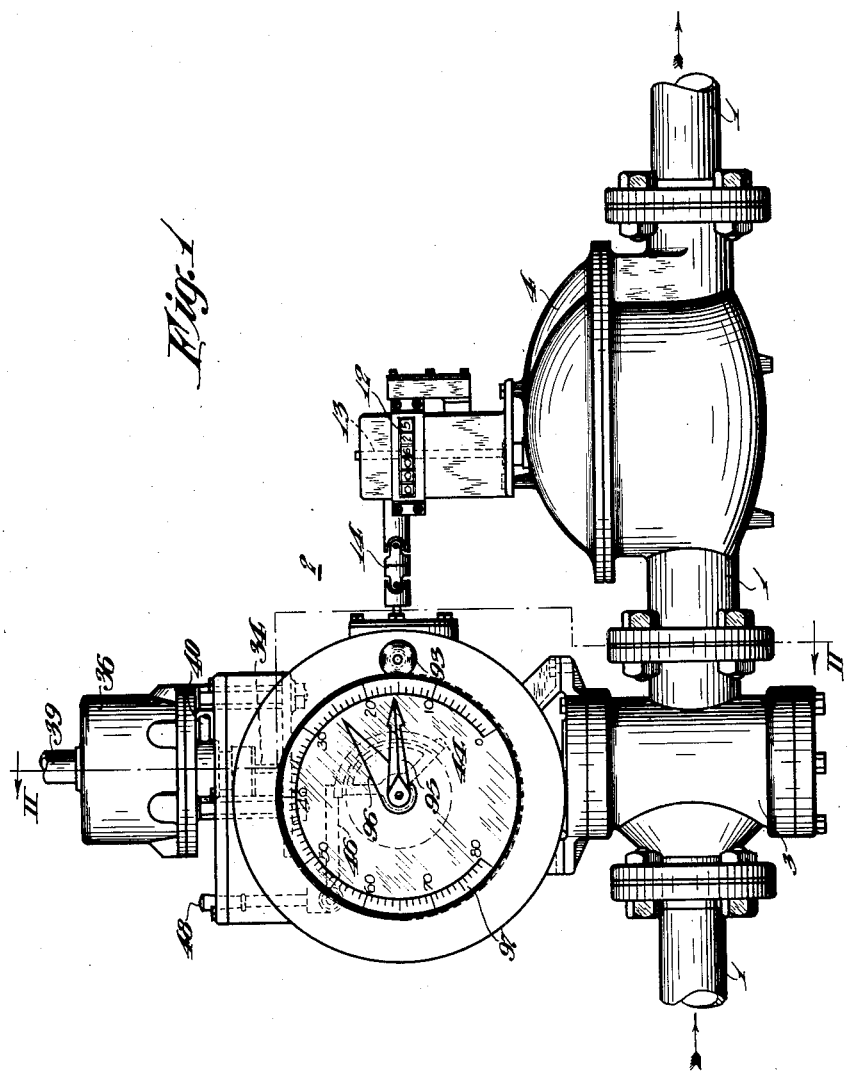
Figure 2:
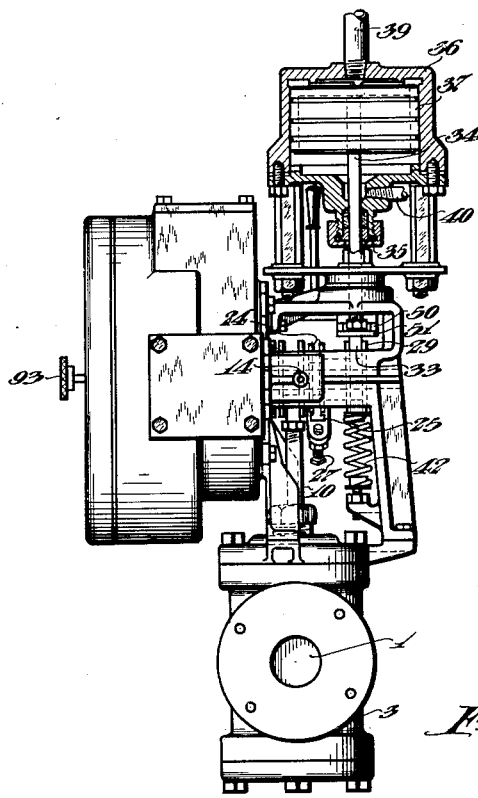
Fig. 2 is a vertical sectional view, taken on the line II—II of Fig. 1.
Figure 3:
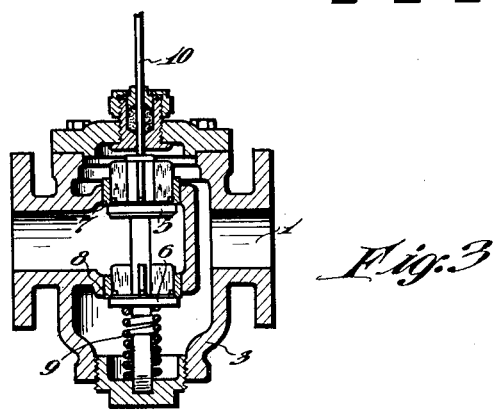
Fig. 3 is a vertical sectional view of one form of valve that may be used with the apparatus and form a part thereof.

Referring to the drawings, and more particularly to Figs. 1, 2 and 3, a conduit 1 is provided for conveying a fluid from a source of supply such as a pump or pressure tank to a point or points to be supplied (not shown).

The flow control device of the present invention is indicated generally at 2, and is in part constituted of a valve 3 and a fluid meter 4, located in the conduit 1, preferably adjacent to each other.

The valve 3 is preferably of the balanced and quick-acting type, that is, it is so constituted that the pressure of the fluid within the conduit 1 is directed against a pair of valve discs 5 and 6 from opposite sides with reference to the corresponding valve seats 7 and 8. Such a valve may be opened easily even when the fluid pressure is very great.

The valve discs 5 and 6 are normally held in the closed position by a spring 9, and are operated by means of a stem 10. It will be apparent from the nature of the valve 3 that only a very short travel of the stem 10 and discs 5 and 6 downward from the closed position shown, is sufficient to create a passage of large area for the fluid through the valve 3.

In the present instance, the flow control device 2 is designed and intended for use in conjunction with a liquid. Accordingly, a liquid meter 4 of standard type is illustrated.

The meter 4 is preferably provided with a counting device or register 12 for recording the total number of volume units which pass therethrough. This register 4 is located as usual on top of the body of the meter 4, and the register is operated by a shaft 13 extending into the meter 4 and connected to the rotating parts thereof.

An operative connection is also provided between the shaft 13 and a flexible shaft 14, the function of which is essential to the operation of the device and will be explained more fully hereinbelow. The shaft 14, being thus operatively connected to the rotating parts of the meter 4, rotates whenever liquid passes through the meter 4, and the amount of such rotation is proportional to the volume of liquid which traverses the conduit 1 and meter 4.

Appropriate housings and supporting members are provided for the various shafts and other members forming a part of the device 2, but as these are of secondary importance and clearly indicated in the drawings, it is unnecessary to describe the same in detail, except as necessary to indicate the natures and functions of the moving or active parts of the device 2. Such housings and supports are, however, conveniently secured to the body of the valve 3.

The valve stem 10 terminates at its upper end in a crosshead 16, that engages a block 17 in such manner that radial displacement of the block 17 causes a vertical displacement of the crosshead 16.

The block 17 is pivotally attached by means of a pin 18 to a cam housing 19 that is integrally mounted upon a shaft 20. Rotation of the shaft 20 causes the block 17 to move through a short arc and moves the crosshead 16 and stem 10 to open or close the valve 3, as the case may be.

A sleeve 22 is mounted upon the shaft 20 and is provided with an enlargement at one end thereof to accommodate a cam 23 mounted upon the shaft 20. The sleeve 22 also carries a cam housing 24, to which a pawl 25 is pivotally attached by a pin 26.

Figure 6:
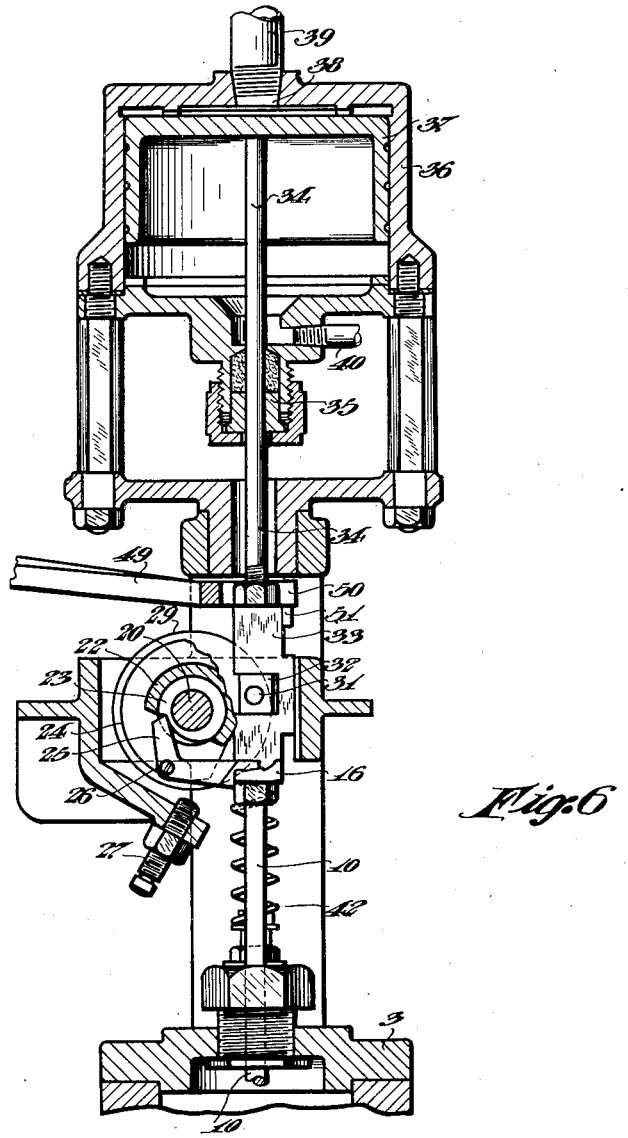
Fig. 6 is a vertical sectional view of a portion of the apparatus, parts being broken away.

The pawl 25 ordinarily engages the cam 23 through an opening in the sleeve 22, and in the view of Fig. 6, the effect of such engagement is to cause clockwise rotation of the shaft 20 when the sleeve 22 is similarly rotated.

Such rotation is limited to an arc slightly greater than is necessary to open the valve 3 by proper setting of a set screw 27 which then engages the pawl 25. A slight further rotation of the sleeve 22 then disengages the pawl 25 and the cam 23, and breaks the temporary operative connection between the shaft 20 and the sleeve 22, permitting the shaft 20 to rotate back a short distance under action of the valve spring 9 until stopped by another device, as will be shown hereinbelow.

The sleeve 22 is also provided with a cam housing 29 that is similar externally to the cam housing 19 and carries a pin 31 and block 32 similar to pin 18 and block 17, respectively. The block 32 engages a crosshead 33, that is connected at one end to a rod 34. The rod 34 passes through a gland 35 into a cylinder 36 and engages a piston 37 slidably mounted in the cylinder 36.

The cylinder 36 is provided with a fluid pressure inlet 38 communicating through a conduit 39 with a source of intermittent fluid pressure, and with a drain 40 below the piston 37, to take care of volume changes and leakage.

When fluid pressure is not applied to the cylinder 36, the crosshead 33, rod 34 and piston 37 are held in the uppermost position by means of a spring 42 bearing against the lower face of the crosshead 33.

In such position, the valve 3 being closed, the pawl 25 engages the cam 23, and consequently a subsequent depression of the piston 37 by rotating the sleeve 22 will cause the rotation of the shaft 20 and the valve 3 will be opened.

Figure 7:
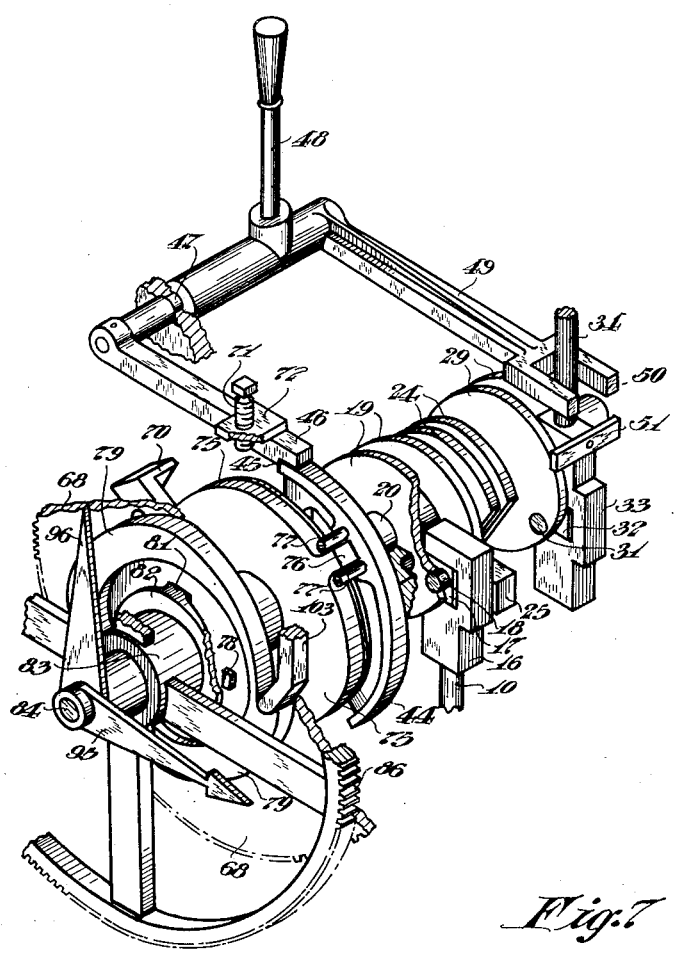
Fig. 7 is a view in isometric projection, of a portion of the apparatus shown in Figs. 1, 2 and 4, parts being broken away.

The shaft 20 is provided at its opposite end with a segment 44 so arranged that one edge thereof will assume a vertical position, as shown in Fig. 7, when the valve 3 is open. The depression of the piston 37 actually causes the segment 44 to rotate somewhat beyond the vertical position so that the segment 44 passes beyond a notch 45 in the free end of an arm 46, allowing that end of the arm 46 to drop slightly.

When the shaft 20 and sleeve 22 are then disengaged by the action of the set screw 27 on the pawl 25, the segment 44 returns until it is obstructed by the notch 45 of the arm 46, and the segment 44 is then held in the position shown in Fig. 7, thus maintaining the valve 3 in the open position.

The arm 46 terminates at its other end in a shaft 47 having a handle 48 at right angles thereto and having also an extension 49 terminating in a yoke 50 that will be engaged and lifted slightly by an arm 51 mounted upon the crosshead 33, when the crosshead 33 subsequently returns to its uppermost position, causing a similar rise of the free end of the arm 46.

It will be apparent that the application of pressure to the top of the piston 37 in the cylinder 36 causes the valve 3 to open, and it is held in that position by the arm 46 and the segment 44 while the direct operative connection between the piston 37 and the valve 3 is broken.

If, the valve 3 now being open as shown in Fig. 7, the arm 46 is raised manually by means of the handle 48 and releases the segment 44, the spring 9 will cause the valve 3 to close. Or, should the pressure above the piston 37 be relieved before the valve 3 is closed by other mechanism hereinafter to be described, the spring 42 will raise the crosshead 33 and when the arm 51 then engages and lifts the yoke 50, the arm 46 rises and releases the segment 44, thus allowing the valve 3 to close. Ordinarily, however, the closing of the valve 3 is effected by the meter 4, and the mechanism for this purpose will now be described.

The segment 44 is provided on one side thereof with a raised wedge or cam 55, so positioned that in the position of the segment 44 corresponding to the closed position of the valve 3, this cam 55 causes a displacement of the free end of a clutch lever 56 pivotally mounted at its opposite end in a swivel 57 and carrying a ratchet clutch member 58, against the action of a spring 59, so that the clutch member 58 is withdrawn from and no longer engages a corresponding clutch member 60.

The clutch member 58 is slidably keyed to a shaft 62 having at its other end a bevel gear 63 that engages a similar bevel gear 64 mounted on the end of the shaft 14.

The clutch member 60 is mounted upon and forms an integral part of a sleeve 65 that is in turn freely mounted over one end of the shaft 62, and which carries at its opposite end a pinion 66.

The clutch lever 56 is restrained from upward displacement under a thrust from the cam 55 by a stop 67 forming a part of the housing of the entire device 2.

When the valve 3 is opened and the segment 44 rotates toward the position shown in Fig. 7, the cam 55 is withdrawn from its position under the free end of the clutch lever 56, and the action of the spring 59 causes the clutch members 58 and 60 to engage and operatively connect the shaft 14 and the pinion 66, so that the latter will rotate proportionately to the amount of liquid traversing the meter 4.

The pinion 66 engages a large gear 68 mounted upon a shaft 69 that is coaxial with and adjacent to the shaft 20. The gear 68 carries upon the side adjacent to the segment 44 a wedge-shaped member 70, so located that rotation of the gear 68 by the pinion 66 eventually causes the wedge 70 to engage a set screw 71 adjustably mounted in an extension 72 of the arm 46. This engagement of the wedge 70 and the set screw 71 lifts the free end of the arm 46 and the segment 44 is released and then rotates back, as above set forth, closing the valve 3, and also moving the clutch lever 56 so as to cause the disengagement of the clutch members 58 and 60.

It is thus apparent that the clutch members 58 and 60 are engaged only when the valve 3 is open. When the valve 3 is closed, the operative connection between the meter 4 and the gear 68 is broken.

It will further be apparent that the distance the wedge 70 must travel before engaging and lifting the set screw 71 will govern the amount of liquid which traverses the meter 4 during the period during which the valve 3 is open.

Accordingly, I provide means for limiting the travel of the wedge 70 to a predetermined and preselected arc, and also means whereby the device automatically resets itself at the conclusion of each period of operation.

The shafts 20 and 69 are connected by means of a clock spring 73, attached at one end by means of a pin 74 to the shaft 69, and at the other end to a housing 75 mounted for rotation on the shaft 69. The housing 75 is provided with a lug 76 that is positioned between a pair of pins 77 extending from the face of the segment 44 adjacent to the housing 75.

The effect of the spring 73, when the clutch members 58 and 60 are disengaged, is to cause the gear 68 to rotate back in a direction opposite to that caused by the rotation of the shaft 14 when the clutch members 58 and 60 are engaged. The gear 68 rotates back under action of the spring 73 until a lug 78 on a cam 79 at one end of the shaft 69 meets a lug 81 on a disc 82 forming a part of a sleeve 83 that is rotatably mounted upon an extension 84 of the shaft 69.

The sleeve 83 is provided with a large gear 86 that engages a pinion 87 mounted upon one end of a shaft 88. The gears 86 and 87 are prevented from turning under the pressure exerted between lugs 78 and 81 by the spring 73 by a ratchet bushing 90 secured to the housing of the device. This ratchet connection is ordinarily held in closed position by means of a spring 91 compressed between the bushing 90 and a flange 92 on the shaft 88, but by means of a handle 93 of the shaft 88, the pinion 87 may be moved axially until the ratchet connection is disengaged, and the disc 82 and lug 81 may then be turned into any desired position, when they are locked by releasing the handle 93.

It will be apparent from the above that by adjustment of the handle 93 and the consequent position of the lug 81, the arc of travel of the lug 78 and consequently of the wedge 70, may be set at any desired fraction of one substantially entire revolution. Thus the setting of the gear 86 governs the amount of liquid that will traverse the meter 4 from the time the valve 3 is opened to the time when the valve 3 is automatically closed, and the device 2 may thus be set to deliver a predetermined amount of liquid.

For the purpose of indicating the setting and operation of the device, I provide an arm or indicating hand 95 attached to the end of the extension 84 of the shaft 69, and a setting hand 96 attached to the end of the sleeve 83, and adjacent to the hand 95. I further provide a face 97 that is preferably marked and calibrated in terms of gallons or other fluid volume units, on a suitable scale, as shown.

To set the device to deliver a definite number of gallons of liquid, the handle 93 is depressed and rotated until the hand 96 is opposite the corresponding division of the scale on the face 97. The hand 95 follows the hand 96 to this position. When pressure is exerted upon the cylinder 36, the valve 3 opens and the meter connection is made, the flow of liquid through the meter causing the hand 95 to rotate in a clockwise direction in the view of Fig. 1.

The adjustment of the set screw 71 is such that the valve 3 is released and closed and the meter connection broken when the hand 95 reaches the zero point on the scale on the face 97, and the spring 73 then causes the hand 95 to return to the hand 96 as the device re-sets itself.

Moving the handle 48 or releasing the pressure on the cylinder 36 before the hand 95 reaches the zero position automatically releases and closes the valve 3 and causes the hand 95 to return immediately to the position of the hand 96, breaks the operative connection to the meter 4, and re-sets the device as before.

Figure 4:
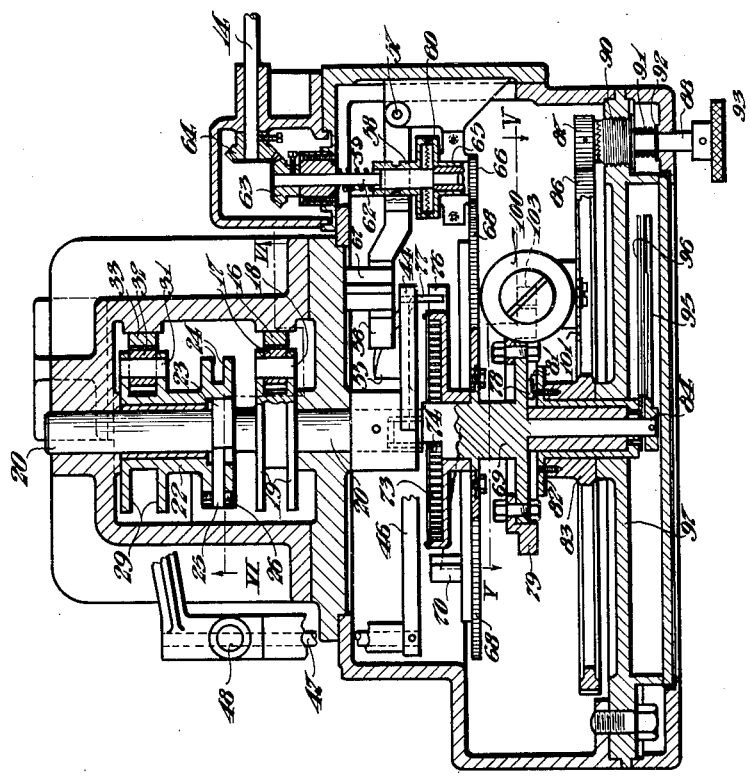
Fig. 4 is a horizontal sectional view of the apparatus shown in Figs. 1 and 2.
Figure 5:
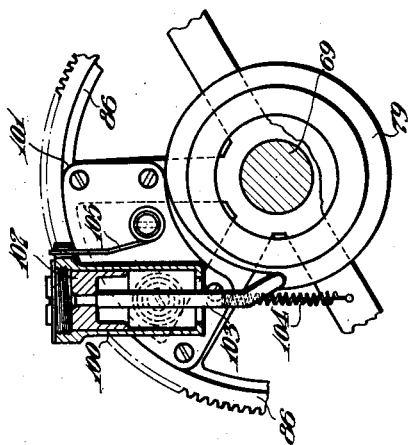
Fig. 5 is a vertical sectional view of a portion of the apparatus, taken along the line V—V of Fig. 4.

In the re-setting operation, the inertia of the rotating parts is such that there is a considerable impact upon engagement of the lugs 78 and 81, and to minimize the shock of this impact, I provide the device shown in Figs. 4 and 5.

In this device, a small cylinder 100 is pivotally secured to a plate 101 mounted upon the side of the gear 86. Slidably but snugly fitted therein is a piston 102, to which is rigidly fastened a bent rod 103, the opposite end of which engages the cam 79 under action of springs 104 and 105.

The action of the piston 102 in the cylinder is similar to that of a dash pot, and the return of the cam 79 to the position of engagement of the lugs 78 and 87 is cushioned by the air confined above the piston 102 in the cylinder 100, thus preventing a severe impact and shock at the moment of engagement.

In assembling the device, care is taken to coordinate the various parts and to eliminate lost motion, in order that the device may be accurate and rapid in action.

Various changes in the several parts of the device may be made without departing from the spirit of my invention, as will be apparent to those skilled in the art. For example, other valves and meters may be substituted for this illustrated, and various other devices may be substituted for the pressure cylinder, the release mechanism, and the like. However, the form illustrated embodies the various parts and devices which I have found to be most advantageous.

Various means may be employed for sending a pressure impulse to the piston 37 within the cylinder 36 at predetermined intervals, for example, a fluid pressure system controlled by solenoid valves operated by a time clock. Or as will be apparent from a further description given below when the apparatus is to be used in conjunction with a particular process or apparatus, any automatic control device which is employed for governing said process or apparatus may also be employed for imparting the initial impulse to the device of the present invention.

The device of my invention has a particular utility with respect to gas manufacturing apparatus and may, for example, be employed to govern the amount of enriching oil supplied to a carburetted water-gas set and is especially advantageous when applied to an automatically controlled set as it renders the operation of the set more completely automatic and accurate than has been possible heretofore. Moreover, when so employed it may be so designed and related to the water-gas apparatus that the automatic control device employed for the operation of the latter also functions to control the operation of the device of the present invention.

The application of my invention to the manufacture of carburetted water gas is illustrated in Fig. 8 and will now be described.

In Fig. 8 there is shown a carburetted water-gas set of the conventional type consisting primarily of a generator 110, a carburetter 111, a superheater 112 and a tar batter 113. This set is provided with the usual air, steam and gas piping and the valves therefor are operated in predetermined sequence through a series of operating cycles by means of an automatic control device 114. This automatic control device is fully described in United States Patent No. 1,670,911, issued May 22, 1928, to Walter A. Barr and Thomas W. Stone and need not here be described in detail.

It consists principally of a master control cylinder 116 within which is slidably situated a more or less spool-shaped piston valve 117 that is reciprocated through successive up and down strokes by means of a time device 118. Midway of the travel of the piston valve 117 there is located on the side of the cylinder 116 a port communicating with a hydraulic pressure conduit 119. Cylinder 116 is drained through a low pressure conduit 121.

The cylinder 116 is connected to the hydraulic operating cylinders of the various valves of the water-gas set by means of pairs of hydraulic pressure and relief conduits in such a manner that the up and down movement of the piston valve 117 causes the operation of these valves according to a predetermined sequence.

For example, there is provided at the top of the superheater 112 an outlet or stack 122 having a stack valve 123 which is operated by means of a hydraulic cylinder 124. The upper and lower ends of the cylinder 124 are connected by means of conduits 125 and 126, respectively, to ports located in the side of the cylinder 116 a distance apart from each other corresponding to the length of the piston valve 117.

It will be apparent from the drawing that in the position shown in Fig. 8 the upper end of the hydraulic cylinder 124 is in communication with the high pressure conduit 119 through the conduit 125 and that the lower end of the piston 124 communicates through the conduit 126 and the interior of the cylinder 116 to the low pressure conduit or drain 121. In this position, the stack valve 123 is held in the raised position required for the blasting period. When the piston valve 117 moves downward in the cylinder 116 and passes the ports of conduits 125 and 126, the pressure conditions within the cylinder 124 will be reversed and the stack valve 123 will be closed. This is the position required during the run period.

The other valves of the water-gas set are similarly fitted with hydraulic operating cylinders and pressure and relief conduits terminating in ports at the side of the cylinder 116 so arranged as to provide the desired sequence of operation of the various valves.

As is well known, the manufacture of carburetted water gas is conducted in a series of cycles, each comprising a blow period and a run period. During the blow period, the generator is blasted with air and the resultant gaseous products of partial combustion are burned in the carburetter 111 and superheater 112 to heat the same, the resultant products of complete combustion being wasted to the atmosphere through the stack valve 123.

During the run period, steam is introduced to the generator which results in the production of blue water gas and this gas is passed through the carburetter 111 and superheater 112 where it is carburetted and enriched by means of oil or other enriching fluid supplied to the carburetter 111. The resultant carburetted water gas is taken off through the tar batter 113 for further treatment and consumption.

The present invention makes it possible to automatically control the amount of oil admitted to the carburetter for carburetting the gas.

The oil for carburetion is obtained from a suitable source of supply 130 under pressure, and is conducted to the carburetter 112 through a conduit 131 and a water-cooled spray 132 in the top of the carburetter 111.

The valve 3 and meter 4 of the device 2 are inserted in the conduit 131, and valves 133 and 134 are provided on either side, also a by-pass conduit 135 having a valve 136 that is normally closed.

The pressure cylinder 36 is in this instance conveniently connected to the conduit 126 through a conduit 137 that corresponds to conduit 39 of Fig. 1.

The valves 133 and 134 are set to give a proper rate of flow when the valve 3 is open, and need not be changed thereafter unless pressure conditions vary. The device 2 is set to deliver the desired amount of oil.

The arrangement is such that as the stack valve 123 is closed, thus inaugurating a run, pressure is applied to the cylinder 36, thus opening the valve 3, which is held open independently of the cylinder 36 until the amount of oil for which the device is set is delivered to the carburetter 111, when the valve 3 is automatically closed, and carburetion ceases.

It may happen that the device 2 is set to deliver a quantity of oil too great to be entirely delivered during the period of the run. In this event, the reversal of pressure conditions in the conduits 125 and 126, which marks the end of the run, relieves the pressure in the cylinder 36, and this automatically closes the valve 3, although the predetermined amount of oil has not been delivered to the carburetter 111. This is necessary because the spraying of oil into the carburetter 111 during the ensuing blow would cause wasteful and dangerous combustion to take place.

Reversal of the direction of flow of steam through the fuel bed of the generator 110, which ordinarily takes place in the course of the cycle, does not in this instance affect the supply of oil to the carburetter 111.

However, while I have described the application of my device to a carburetted water-gas set of the hot-valve type, operated by a hydraulic control device, it may obviously be readily adapted to the requirements of other types of sets and other control devices.

It will be noted that my invention provides apparatus for automatically supplying a predetermined amount of fluid to a point or points at predetermined intervals that is effective and accurate, advantageous with respect to the prior art, and of especial utility in the manufacture of gas.

Various other modifications and applications of the device or devices of my invention are possible, and my invention is accordingly not limited to the specific applications and embodiments described herein, except as stated in the claims hereinafter made.

I claim as my invention:

1. In combination, a fluid conduit, a meter located in said conduit, a valve located in said conduit and biased toward its closed position, means responsive to pressure adapted to open said valve, a detent for holding said valve open, a releasing device for moving said detent, flexible means interposed between said detent and said releasing device for biasing the same apart, and means actuated by said meter for causing said releasing device to move said detent and permit said valve to close after a predetermined volume of fluid has traversed said meter.

2. In combination, a fluid conduit, a meter located in said conduit, a valve located in said conduit and biased toward its closed position, means responsive to pressure adapted to open said valve, a detent for holding said valve open, a releasing device driven by said meter for moving said detent to permit said valve to close, flexible means for biasing said detent and said releasing device apart, and a stop for limiting the distance between said releasing device in its biased position and said detent according to a predetermined figure.

3. In combination, a fluid conduit, a meter located in said conduit, a valve located in said conduit and biased toward its closed position, means responsive to pressure adapted to open said valve, a detent for holding said valve open, a releasing device driven by said meter for moving said detent to permit said valve to close, flexible means for biasing said detent and said releasing device apart, a stop for limiting the distance between said releasing device in its biased position and said detent, and means for adjusting the position of said stop to necessitate a predetermined displacement of said releasing device by said meter prior to its engagement with said detent, said displacement being in accordance with the flow of a predetermined volume of fluid through said meter.

4. In combination, a fluid conduit, a meter located in said conduit, a valve located in said conduit and biased toward its closed position, means responsive to pressure adapted to open said valve, a detent for holding said valve open, a releasing device adapted to travel in a path intercepting said detent and driven by said meter, means for predetermining the amount of travel necessary for said releasing device to engage and move said detent to permit said valve to close in accordance with the passage of a predetermined volume of fluid through said meter, and flexible means for re-setting said releasing device after each closing of said valve.

5. In combination, a fluid conduit, a meter located in said conduit, a valve located in said conduit and biased toward its closed position, means responsive to pressure adapted to open said valve, a detent for holding said valve open, a releasing device adapted to travel in a path intercepting said detent and driven by said meter, means for predetermining the amount of travel necessary for said releasing device to engage and move said detent to permit said valve to close in accordance with the passage of a predetermined volume of fluid through said meter, means for breaking the connection between said meter and said releasing device when said valve closes, and flexible means for biasing said releasing device away from said detent.

6. In combination, a fluid conduit, a meter located in said conduit, a valve located in said conduit and biased toward its closed position, means responsive to pressure adapted to open said valve, a detent adapted to hold said valve open, a release for said detent, a clutch adapted to make operative connection between said meter and said release when said valve opens and to break the same when said valve closes, whereby said release is driven toward said detent by said meter so long as the valve is open but is released from said meter when the valve closes, flexible means for biasing said release in a direction opposite to that in which it is driven by said meter, and a stop for limiting the travel of said release in accordance with the passage of a predetermined volume of fluid through said meter.

7. In combination, a fluid conduit, a meter located in said conduit, a valve located in said conduit and biased toward its closed position, means responsive to pressure adapted to open said valve, a detent adapted to hold said valve open, a release for said detent, a clutch adapted to make operative connection between said meter and said release when said valve opens and to break the same when said valve closes, whereby said release is driven toward said detent by said meter so long as the valve is open but is released from said meter when the valve closes, flexible means for biasing said release in a direction opposite to that in which it is driven by said meter, a stop for limiting the travel of said release, and means for varying the position of said stop in accordance with the passage of a preselected volume of fluid through said meter.

8. In combination, a fluid conduit, a valve located in said conduit and biased toward its closed position, a shaft having a lever connected to said valve, a sleeve surrounding said shaft, a pawl operatively connecting said sleeve and said shaft, means responsive to pressure for rotating said sleeve and said shaft to open said valve, a stop adapted to engage said pawl to free said shaft from said sleeve after said shaft has been rotated sufficiently to open said valve, a detent for preventing rotation of said shaft to close said valve after said stop has engaged said pawl, and means for releasing said detent to permit said valve to close when a predetermined volume of fluid has passed through said conduit.

9. In combination, a fluid conduit, a valve located in said conduit and biased toward its closed position, a shaft having a lever connected to said valve, a sleeve surrounding said shaft, a pawl operatively connecting said sleeve and said shaft, means responsive to pressure for rotating said sleeve and said shaft to open said valve, a stop adapted to engage said pawl to free said shaft from said sleeve after said shaft has been rotated sufficiently to open said valve, a detent for preventing rotation of said shaft to close said valve after said stop has engaged said pawl, a meter located in said conduit, a release for said detent adapted to be driven by said meter, a clutch governing the operative connection between said release and said meter, a cam on said shaft for closing said clutch when said valve is open and opening it when said valve is closed, flexible means adapted to bias said release away from said detent, and a stop for predetermining the travel of said release from its biased position to the point where it releases said detent and permits said valve to open.

10. In combination, a fluid conduit, a meter located in said conduit, a valve located in said conduit and biased toward its closed position, means responsive to pressure adapted to open said valve, a detent for holding said valve open, a releasing device for moving said detent that is actuated by said meter, whereby the detent may be moved and the valve closed after a predetermined volume of fluid has traversed said meter, and independent means adapted to move said detent to permit the valve to close whenever said pressure is relieved prior to the passage of said predetermined volume of fluid through said meter.

11. In combination, a fluid conduit, a valve located therein and biased toward its closed position, a pressure-responsive device for opening said valve, means for then releasing said valve from said opening device, a detent for holding said valve in its open position, means for releasing said detent to permit said valve to close when a predetermined volume of fluid has passed through said conduit, and independent means for releasing said detent whenever the pressure upon said valve-opening device is relieved.

12. In combination, a fluid conduit, a valve located therein and biased toward its closed position, a pressure-responsive device for opening said valve, means for then releasing said valve from said opening device, a detent for holding said valve in its open position, and means for releasing said detent whenever the pressure upon said valve-opening device is relieved.

13. In combination, a fluid conduit, a valve located in said conduit, a detent for holding said valve open, a release for said detent and adapted to engage and move said detent to permit said valve to close, flexible means for biasing said release away from said detent, a stop adapted to govern the distance between said release and said detent when said release is in its biased position, and a cushioning device located between said reelase and said stop.

14. In combination, a fluid conduit, a valve located in said conduit, a detent for holding said valve open, a release for said detent and adapted to engage and move said detent to permit said valve to close, flexible means for biasing said release away from said detent, a stop adapted to govern the distance between said release and said detent when said release is in its biased position, and a cushioning device located between said release and said stop, comprising a pneumatic piston valve.

15. In combination, a fluid conduit, a valve located therein, a pressure responsive device operatively connected to said valve and adapted to open said valve when pressure is applied thereto and to close said valve when said pressure is relieved if said valve has not previously been closed, and means operated by the flow of fluid to said conduit that is adapted to close said valve when a predetermined volume of fluid passes through said conduit before the pressure upon said pressure responsive device is relieved.

WALTER A. BARR.